Figure 7:
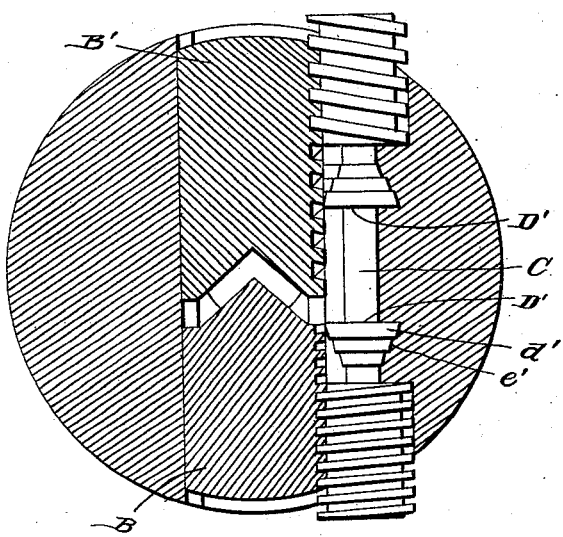

No. 708,735. Patented Sept. 9, 1902.
C. H. REID.
CHUCK.
(Application filed Dec. 7, 1901.)
(No Model.) 2 Sheets—Sheet 1.
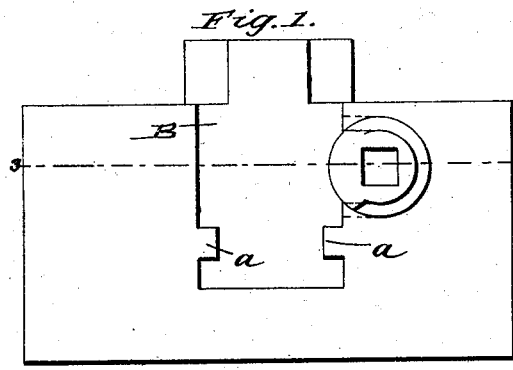
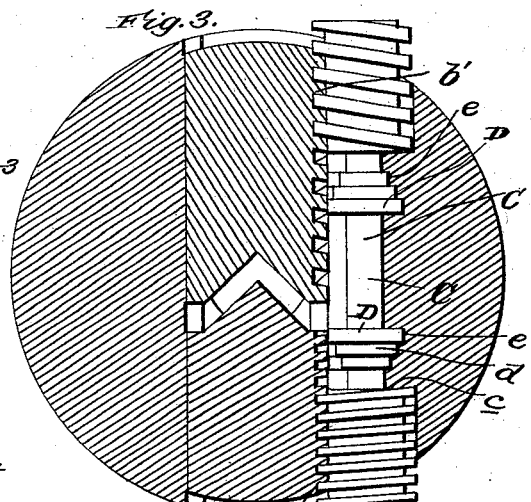
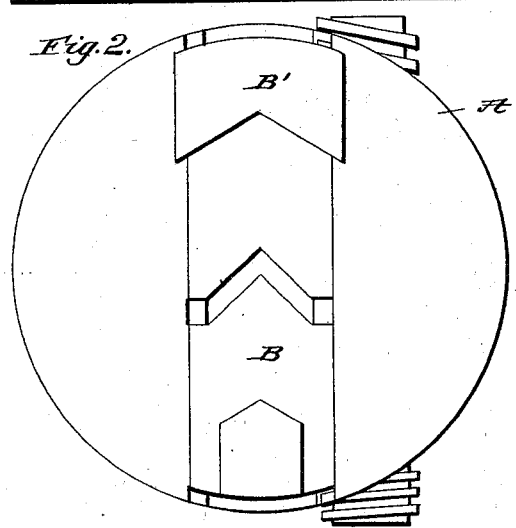
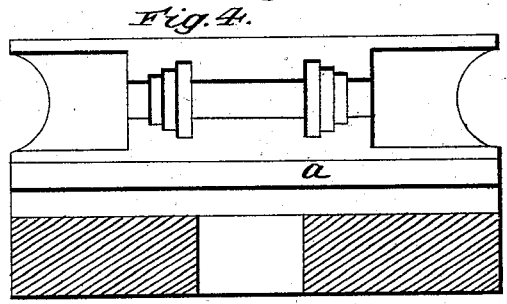
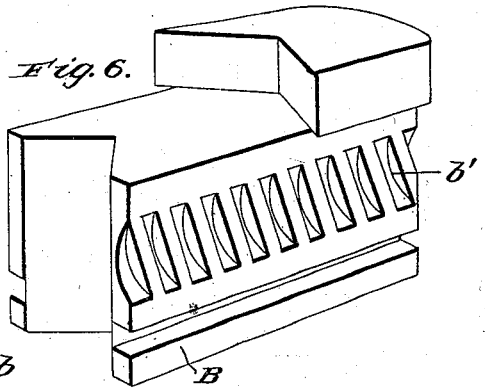
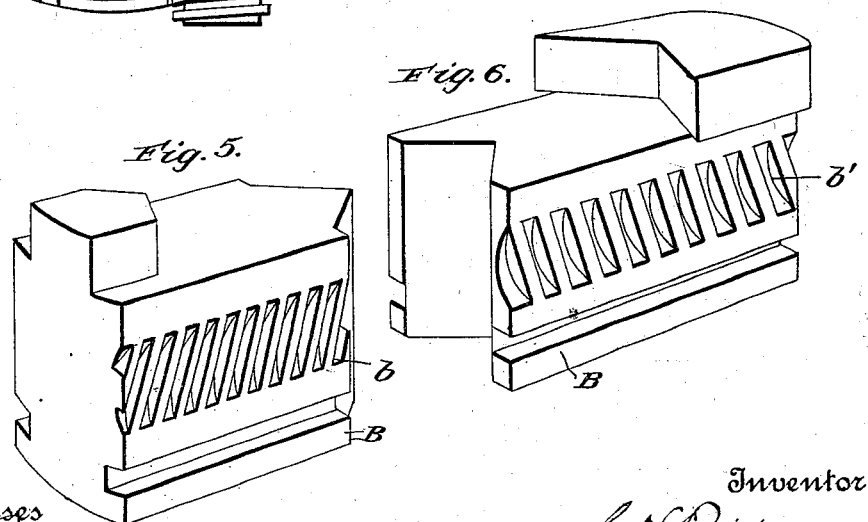
Witnesses Inventor
C. H. Raeder C. H. Reid
N. C. Healy By James J. Shichy
  Attorney No. 708,735. Patented Sept. 9, 1902.
C. H. REID.
CHUCK.
(Application filed Dec. 7, 1901.)
(No Model.) 2 Sheets—Sheet 2.

UNITED STATES PATENT OFFICE.

CHARLES H. REID, OF DANBURY, CONNECTICUT.

CHUCK.

SPECIFICATION forming part of Letters Patent No. 708,735, dated September 9, 1902.

Application filed December 7, 1901. Serial No. 85,036. (No model.)

*To all whom it may concern:*

Be it known that I, CHARLES H. REID, a citizen of the United States, residing at Danbury, in the county of Fairfield and State of Connecticut, have invented new and useful Improvements in Chucks, of which the following is a specification.

My invention relates to chucks, and is designed more particularly as an improvement upon the chuck disclosed in my Reissue Letters Patent No. 10,766, of September 21, 1886. The said chuck is made up of a frame or head, slidable jaws arranged in suitable bearings therein and having oppositely-disposed threads at their sides, and a screw having right and left handed threads engaging the opposite threads of the jaws, so that the jaws will be drawn together or spread apart, according to the direction in which the screw is turned, and also having collars disposed between the threads on the screw-shank and the middle of said shank and snugly arranged in corresponding recesses in the head, the said collars being designed to increase the number of the bearing-surfaces between the screw and head with a view of removing strain from and preventing wear of the shoulders at the inner ends of the threaded portions of the screw and the consequent endwise play of the screw, which would permit of movement of the jaws and work held thereby and destroy the usefulness of the chuck. The collars are, moreover, advantageous when work is being done, such as turning or cutting off, since there is considerable longitudinal thrust on the screw every time the jaws come into alinement with the tool, which thrust is resisted by the collars, and they are also advantageous because they withstand the shock when work held in the jaws is hammered in line with the direction of movement of the jaws, and thereby prevent breakage of the parts of the screw which abut against the head.

The general object of my present invention is to improve the type of chuck stated by the provision on the screw therein of collars of peculiar formation which are more efficient than the collars extant in preventing rapid or undue wear of the shoulders of the screw as well as breakage of said shoulders or other parts of the chuck when the screw is subjected to endwise thrust or shock.

Other advantageous features of the invention will be fully understood from the following description and claims when taken in conjunction with the annexed drawings, in which—

Figure 1 is a side elevation of my improved chuck; Fig. 2, a plan; Fig. 3, a section taken in the plane indicated by the line 3 3 of Fig. 1, with the screw in plan; Fig. 4, a vertical section through the frame or head with the jaws and screw removed; Fig. 5, an enlarged perspective view of one jaw removed; Fig. 6, a similar view of the other jaw; and Figs. 7 and 8, sections similar to Fig. 3, but illustrating modified forms of collars on the screw.

Referring by letter to the drawings, and more particularly to Figs. 1 to 6 thereof, A is the chuck head or frame, recessed and having suitable bearings $a$ for the jaws. B B' are the jaws, and C is the improved screw, arranged in the frame alongside the path of the jaws. The jaws B B' are provided at their sides with opposite screw-threads $b$ $b'$ and are inserted in the head or frame with their threads in engagement with the threads of the screw C, which latter threads are right and left handed, as shown, in order to draw the jaws together or spread them apart, according to the direction in which the screw is turned. In addition to the said right and left hand threads the screw has shoulders $c$, arranged to abut against the head or frame A, as best shown in Fig. 3, and two collars D, disposed between the said shoulders and the middle of the screw-shank. These collars D, which constitute the gist of the present invention, are in the form of cones, disposed as shown with respect to the threads and shoulders of the screw and provided with steps $d$, and they are snugly arranged in correspondingly-stepped recesses $e$ in the chuck head or frame. By virtue of this it will be observed that the said collars are divided into pluralities of sections, the face and perimeter of each engaging the chuck head or frame at a different point—*i. e.*, a different distance from the middle of the screw-shank. It will also be observed that being tapered or gradually reduced in diameter toward their outer ends or in the direction in which strain, thrust, and shock are imposed on the screw when the chuck is in use the collars D are much less liable to be broken or injured by such strain, thrust, or shock than the collars at present in use, which have plain bearing-surfaces extending at right angles from the screw-shank to their perimeters, and, further, it will be observed that the pluralities of surface sections on the collars, each engaging the head or frame at a different point, are highly advantageous, because in the event of one or more of said surface sections tending to wear or break the others may be depended on to hold the screw against endwise play, and thereby prolong the usefulness of the chuck. This latter advantage will be appreciated when it is remembered that the portions of the head A presented to the several steps of the collars may be different in character—i. e., one portion may be softer than the others or may contain a flaw not common to such others. The stepped collars as compared with those having plain bearing-surfaces extending at right angles from the screw-shank to their perimeters are also advantageous, because in the positions shown greater thicknesses of the head are afforded to resist the thrust of said collars than would be afforded to resist the thrust of plain collars in corresponding positions.

The described ability of the improved collars D to resist frictional wear, as well as strain, thrust, and shock imposed on the screw, enables them to effectually remove strain from and prevent wear of the shoulders c, and thereby prolong the usefulness of the chuck to a much greater extent than collars of the ordinary form.

Aside from the feature described the jaws B B' may be of any suitable construction. They are placed in the recessed head or frame after the screw C, and said screw is then operated until engagement of the same with the jaws is effected, when the chuck is ready for use.

Notwithstanding the advantages of the peculiar collars D as pointed out in the foregoing, it will be appreciated that chucks embodying the same may be produced almost if not quite as cheaply as the chuck disclosed in my aforesaid patent.

The modified construction shown in Fig. 7 is similar to that in Figs. 1 to 6, with the exception that its collars D' have the peripheries of their steps d' beveled or tapered, and the walls of the stepped recesses e' are correspondingly beveled or tapered. Such modified construction possesses all the advantages of the construction shown in Figs. 1 to 6 and the additional advantage that the perimeters, as well as the outer faces of the steps d', form bearings to remove strain from and prevent wear of the shoulders at the inner ends of the threaded portion of the screw.

Figure 8:
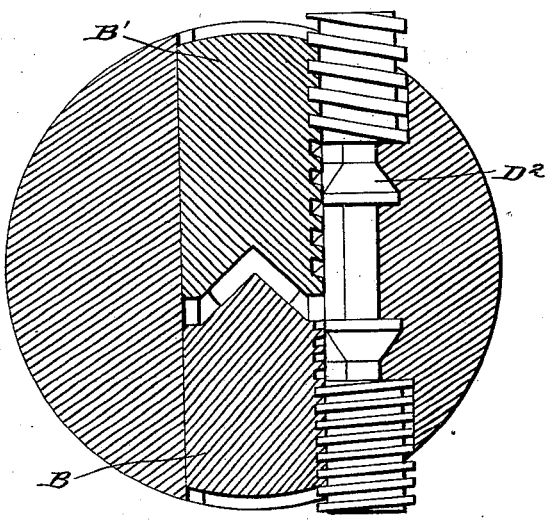

The plain cone-shaped collars $D^2$ embraced in the construction shown by Fig. 8 are advantageous, because, like the collars shown in Figs. 1 to 7, they are better able to withstand strain, thrust, and shock imposed on the screw than collars which have plain bearing-surfaces disposed at right angles to the screw-shank and extending from said shank to their peripheries.

Having described my invention, what I claim, and desire to secure by Letters Patent, is—

1. In a chuck, the combination of a frame, threaded jaws therein, and a screw arranged in the frame and having right and left handed threaded portions engaging the threads of the jaws, and shoulders c at the inner ends of said threaded portions arranged to abut against the frame, and also having collars disposed between the shoulders c; the said collars being reduced in diameter outwardly, and arranged in correspondingly-shaped recesses of and bearing against the frame.

2. In a chuck, the combination of a frame, threaded jaws therein, and a screw arranged in the frame and having right and left handed threaded portions engaging the threads of the jaws, and shoulders c at the inner ends of said threaded portions arranged to abut against the frame, and also having cone-shaped collars provided with steps, at points between the shoulders c; the said collars being arranged with their reduced ends outwardly, and in correspondingly shaped and stepped recesses of the frame.

3. In a chuck, the combination of a frame, threaded jaws therein, and a screw arranged in the frame and having right and left handed threaded portions engaging the threads of the jaws, and shoulders c at the inner ends of said threaded portions arranged to abut against the frame, and also having, at points between the shoulders c, cone-shaped collars provided with steps, the perimeters of which are beveled or tapered toward the reduced ends of the collars; the said collars being arranged with their reduced ends outwardly and in correspondingly shaped and stepped recesses of the frame.

In testimony whereof I have hereunto set my hand in presence of two subscribing witnesses.

CHARLES H. REID.

Witnesses:
EUGENE C. DEMPSEY,
JOHN C. DORAN.